Patented May 3, 1949

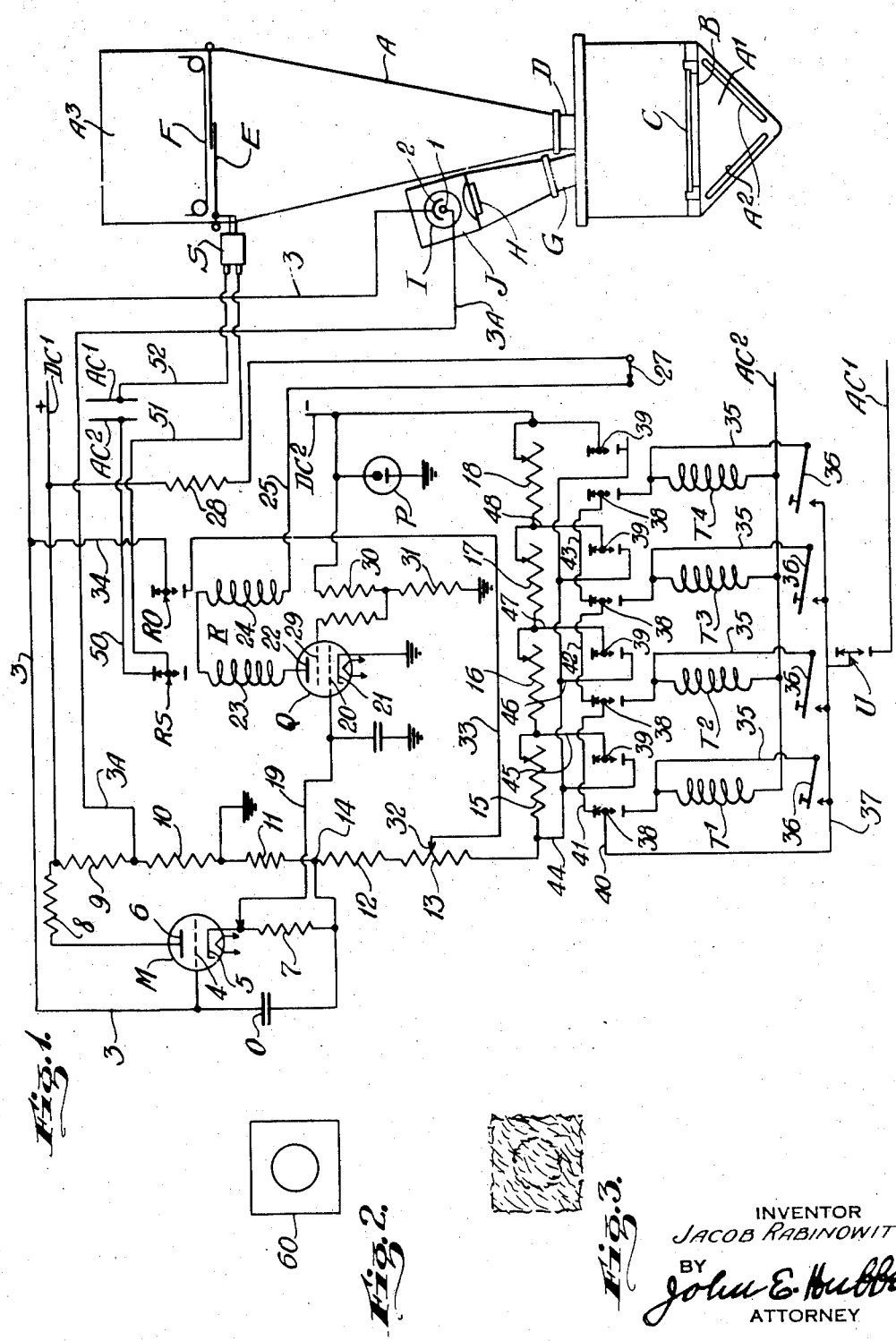

2,469,076

UNITED STATES PATENT OFFICE 2,469,076

PHOTOGRAPHIC PRINTING EXPOSURE CONTROL METHOD AND APPARATUS

Jacob Rabinowitz, Brooklyn, N. Y., assignor, by mesne assignments, to Pavelle Color Incorporated, New York, N. Y., a corporation of Delaware Application May 18, 1945, Serial No. 594,403

15 Claims. (Cl. 88—24)

1

The general object of the present invention is to provide an improved method of and means for controlling the exposure period of a camera or projection printer. More specifically stated, the general object of the present invention is to provide a camera shutter operating mechanism which includes simple and effective means operating automatically in response to a light measurement and tending to establish an exposure period which minimizes the average under and over exposures of different portions of the picture formed, and which also includes means manually adjustable to increase or decrease the exposure period which the automatically operating means tends to establish. The use of the manually adjustable means makes it possible to avoid objectionable under exposure or over exposure of some particular portion of the picture which might otherwise occur.

The invention was primarily devised, and is of especial utility for use in controlling the exposure period of a reproducing camera or projection printer, by means including a photoelectric cell to which light is transmitted through a negative or other picture bearing transparency to be reproduced, in such manner that the amount of light transmitted to the cell is in predetermined proportion to the average transparency of the negative. Such a measurement provides what may be called a basic exposure period which will give optimum reproduction results in the case of a negative having no unusual contrast between its relatively light and relatively dark portions, and requiring no special action or means to avoid or minimize over exposure in the reproduction of some particular light portion of the negative, or to avoid or minimize under exposure in the reproduction of some particular dark portion of the negative.

In the preferred practical form of the invention, I provide a control circuit arrangement including a photoelectric cell, a condenser and electronic means which cooperate to establish what I have referred to as a basic exposure period, and also including manually adjustable resistance means for increasing or decreasing the basic exposure period by predetermined amounts as required to avoid under exposure or over exposure of some particular portion of the picture.

The various features of novelty which characterize my invention are pointed out with particularity in the claims annexed to and forming a part of this specification. For a better understanding of the invention, however, its advantages, and specific objects attained with its use,

2 reference should be had to the accompanying drawing and descriptive matter in which I have illustrated and described a preferred embodiment of the invention.

Of the drawings:

Fig. 1 is a diagrammatic representation of apparatus adapted for use in realizing the above stated objects of the invention; and Figs. 2 and 3 are views diagrammatically illustrating a desirable light measuring image condition.

In the preferred embodiment of the invention shown diagramatically by way of example in Fig. 1, A represents a reproducing camera or projection printer comprising a light chamber A' including a light source, which may consist of neon tubes $A^2$, for transmitting light through a negative or other picture bearing transparency C to the main reproducing lens D of the camera. As shown, the negative C rests on a support B which may be a plate of translucent glass. A camera shutter E is interposed between the lens D and the light sensitive surface of a strip F of sensitized paper F or other material, on successive sections of which a reproduction of the scene or image on a negative or negatives occupying the position of the negative C, may be printed. As diagrammatically shown, the camera structure includes a light-proof housing $A^3$ enclosing the strip material F and mechanism, which need not be described or illustrated herein, for advancing said strip material between successive printing operations.

In accordance with the present invention, the camera is provided with a measuring lens G through which an image of the picture on the negative C is projected through a collecting lens H to a light sensitive device I. Ordinarily, and as shown, the device I is a photoelectric tube or cell of the high vacuum type. The tube I and lens H are mounted in a supporting structure J which may be carried by and form a part of the camera housing structure. As diagrammatically shown, the structure J is directly mounted on the tubular casing or housing of the measuring lens G.

As diagrammatically shown in Fig. 1, a measure of the intensity of the light transmitted to the photoelectric cell I, and a control effect dependent upon that intensity, are obtained by means including circuit connections through which the anode I and cathode 2 of the cell I are connected to an amplifying and control system. That system as shown includes alternating current supply conductors AC1 and AC2 of opposite polarities, and direct current supply conductors DC1 and DC2, respectively positive and negative. As shown, said system also includes an electronic triode tube M, and a condenser O in the grid circuit of said tube. In the normal intended use of the present invention, the condenser O is given a regulable electrical charge preparatory to each camera exposure and said charge is discharged during the following exposure period at a rate dependent upon the current flow through the phototube I and hence upon the intensity of the light received by the latter. In accordance with the present invention, the automatic control of the exposure period effected through the phototube response to the light transmitting capacity of the negative, may be supplemented by manual adjustment of the condenser charging means to thereby vary the charge given the condenser O, as is hereinafter explained.

As shown, a conductor 3 connects the cathode 2 of the cell I to one terminal of the condenser O and that condenser terminal is connected to the grid 4 of the tube M. The second terminal of the condenser O is connected to the cathode 5 of the tube M through a resistance 7. The anode 1 of the photocell I is connected by conductor 3A to the plate 6 of the tube M through resistances 8 and 9 and is connected to ground through a high resistance 10. The second terminal of the condenser O and the lower end of the resistance 7 are also connected to ground through a resistance 11 much smaller than the resistance 10. The plate circuit of the triode M includes direct current supply conductors DC1 and DC2, the resistance 8 and other resistances hereinafter described.

The previously mentioned resistances 9, 10 and 11 are connected in series with one another and with resistances 12 and 13 to form a so-called bleeder line, or voltage divider, in which the potential progressively diminishes from the upper end of the resistance 9 to the lower end of the resistance 13. The upper end of the resistance 9 is directly connected to the direct current supply conductor DC1, and its potential is constant in normal operation. The lower terminal of the condenser O and the resistance 7 are connected to the voltage divider at a point 14 between resistances 11 and 12. The lower end of the resistance 13 is connected to the direct current supply conductor DC2 by rheostatic means provided in accordance with the present invention and adjustable to vary the potential of the lower end of the voltage divider in a series of steps of definite and predetermined magnitudes.

In the preferred form shown, said rheostatic means comprises adjustable resistances 15, 16, 17 and 18 connected in series between the resistance 13 and the supply conductor DC2, and manually adjustable means through which one, or any larger number, of said resistances may be short-circuited, as is hereinafter fully explained. The potential of the supply conductor DC2 is fixed by connecting it to ground through a glow tube P, so that the potential of the conductor DC2 is negative relative to ground by the potential difference required to maintain current flow through the glow tube.

The triode M produces its control effect through an electronic relay tube Q of the thyratron type. Cathode 5 of the triode M is connected by a conductor 19 to the control grid 20 of tube Q. The latter has its cathode 21 grounded, and has its anode 22 connected to supply conductor DC1 through relay coils 23 and 24, conductor 25, switch 27, conductor 26 and a resistance 28 connecting conductor 26 to supply conductor DC1. The tube Q has a screen grid 29 connected through a resistance to the junction point of the resistances 30 and 31 which are connected in series with one another between the glow tube and ground and are proportioned to impress a suitable bias voltage on the screen grid 29.

The coils 23 and 24 are included in the plate circuit of the thyratron Q and form the energizing coils, connected between the D. C. supply conductors DC1 and DC2, of a relay R. With switch 27 closed, the plate circuit of the tube Q is completed from conductors DC1 and DC2 by ground connection to the cathode 21 and the glow tube P. The relay R controls separate relay switches RO and RS, each of those switches being biased to its upper position shown in Fig. 1, and being moved into its lower position by the relay R when the latter is energized by current flow through tube Q.

When the tube Q is energized and the switch RO is in its lower position it connects the conductor 3 and thereby the upper terminal of the condenser O to the voltage divider at a point 32 which is the point of engagement of a slider contact with the resistance 13. The potential at the point 32 is lower than at the point 14 to which the lower terminal of the condenser O is directly connected. Said slider contact is connected to one end of a conductor 33 which has its other end connected to the fixed switch member of the switch RO. The movable switch member is connected by a conductor 34 to the conductor 3 and thereby to the upper terminal of the condenser O. When the tube Q becomes nonconductive and the relay R is deenergized, the resultant up movement of the movable member of the switch RO breaks the connection between the conductor 3 and the resistance 13.

The slider 32 is adjustable manually longitudinally of the resistance 13, which thus serves as a potentiometer resistance, to vary the charging potential impressed on the condenser O preparatory to each camera exposure. The rheostatic means including the resistances 15, 16, 17 and 18 and associated parts now to be described, form a second and highly reliable means for varying the charging potential and thereby the potential charge impressed on the condenser O preparatory to each camera exposure in a series of steps of definite and predeterminable magnitude.

The means associated with the resistances 15, 16, 17 and 18 for varying the charging potential impressed upon the condenser O comprise a plurality of similar relays T1, T2, T3 and T4. As diagrammatically shown, each of said relays includes an energizing coil having its lower end permanently connected to an alternating supply conductor AC2, and includes a conductor 35 and a push button 36 through which the upper end of said coil may be connected to a conductor 37. For purposes hereinafter described, the conductor 37 may be energized and deenergized by means shown diagrammatically as comprising a switch U operative to connect the conductor 37 to, and to disconnect it from an alternating supply conductor AC1. Each of the relays T1—T4 includes two switch members 38 and 39 which are biased to the upper positions in which they are shown, and are moved into their lower positions when the relay is energized by the closure of the push button switch 36 of the relay, provided the conductor 37 is then connected to and energized by the associated supply conductor AC1.

When any one of the relays is energized by the depression of the corresponding push button switch 36, the resultant down movement of the switch member 38 of the relay closes a hold-in circuit which maintains said switch member in its lower position after said push button switch 36 is allowed to reopen. The hold-in circuit for the relay T1 comprises a conductor 40 connecting the movable switch 38 of the relay to the conductor 37, and includes the lower contact engaged by the switch member 38 when the latter is depressed, said contact being permanently connected to the upper end of energizing coil of the relay T1. The hold-in circuit for the relay T2 includes the conductor 40 and a conductor 41 which connects the switch member 38 of the relay T2 to the upper contact associated with the movable switch member 38 of the relay T1. The hold-in circuit for the relay T3 includes the conductors 40 and 41, and a conductor 42 which connects the upper contact associated with the switch member 38 of the relay T2 to the switch member 38 of the relay T3. The hold-in circuit for the relay T4 includes the conductors 40, 41, 42 and a conductor 43 which connects the upper contact associated with the swi' member 38 of the relay T3 to the switch member 38 of the relay T4.

The energization of the relay T1 effects a movement of the switch member 39 of that relay which short circuits the resistance 15. The energization of the relay T2 causes its switch member 39 to short circuit both resistances 15 and 16, similarly, the energization of relay T3 short circuits the resistances 15, 16 and 17, and the energization of the relay T4 short circuits all four of the resistances 15, 16, 17 and 18. The means through which one or more of the resistances 15—18 are thus short circuited, comprise a conductor 44 having one end connected to the left-hand end of the resistance 15 and having branches connected to the lower contacts respectively associated with the switch members 39 of the relays T1—T4, and also comprise conductors 45, 46, 47 and 48 separately associated with the movable switch members 39 of the relays T1, T2, T3 and T4, respectively. As shown, the conductor 45 connects the switch member 39 of the relay T1 to the right-hand end of the resistance 15. Similarly, the conductors 46, 47 and 48 connect the switch members 39 of the relays T2, T3 and T4 to the right-hand ends of the resistances 16, 17 and 18, respectively.

The relay R operates through the switch RS to control the mechanism S which opens and closes the shutter E. With the relay R energized, the shutter operating mechanism S is deenergized and the shutter E is closed. When the relay R is deenergized, the movement of the switch member RS into its upper position by a bias force opens the shutter E by completing an energizing circuit for the shutter operating mechanism S. That circuit includes a conductor 50 connecting the stationary upper contact associated with the switch RS to the alternating current supply conductor AC2, and a conductor 51 connecting the switch member RS to one terminal of the mechanism S. The second terminal of that mechanism is connected by a conductor 52 to the alternating supply chamber AC1.

Apparatus of the character shown in the drawings cannot become fully operative when connected to a suitable source of electrical energy until the cathodes of the tubes M and Q are suitably heated and current flow through the glow tube P is established. In my copending application, Serial No. 578,202, filed February 16, 1945, now abandoned, I have disclosed starting means through which the full energization of a control system, similar in many of its features to the system disclosed herein, is delayed, following the initial connection of the system to an electric energizing source, for an interval of fifteen seconds or so sufficient to insure the proper heating up of the cathodes of tubes corresponding to the tubes M and Q, and for the establishment of current flow through a glow tube corresponding to the tube P. The said starting means disclosed in said prior application may be used with the apparatus shown herein but no necessity appears for illustrating and describing said starting mechanism herein.

In the deenergized condition of the system, the tubes M and Q are necessarily non-conductive. As soon as the system becomes fully energized, the tube M becomes conductive. The resultant current flow in the plate circuit of the tube M increases the potential of the cathode 5 of the tube M and thereby the potential of the control grid 20 relative to the cathode 21 of the thyratron tube Q and the latter becomes conductive. When the tube Q is thus made conductive, current flow through its plate circuit energizes the relay R and the latter moves the switch members RO and RS into their lower positions. The down movement of the switch member RS opens the energizing circuit of the shutter operating mechanism S. The down movement of the switch member RO initiates the operation of charging the condenser O, by connecting the conductor 3 and thereby the upper terminal of the condenser to the voltage divider at the point 32 through the conductors 33 and 34 and switch RO. In practice, the characteristics of the condenser O and its charging circuit are such that only a fraction of a second is required for the condenser to acquire the full charge corresponding to the potential difference between the points 14 and 32 of the voltage divider.

When the energization of the relay R establishes the charging circuit of the condenser O, it lowers the potential of the control grid 4 relative to the cathode 5 of the troide M and thus makes the latter non-conductive. The resultant decrease in the potential of the control grid 20 of the tube Q does not interrupt or vary the current flow in the plate circuit of the tube Q, because of a well known characteristic of the thyratron type tube.

With the apparatus shown in its normal operative condition and with the relay R energized and the condenser O properly charged the operation of printing a picture on the sensitized strip F from the negative C is initiated by opening the previously closed switch 27. This interrupts current flow through the thyratron Q and deenergizes the relay R. The deenergization of the relay R operates through the switch RO to open the charging circuit for the condenser O and operates through the switch RS to close the circuit including the conductors 50, 51 and 52 through which the shutter operating mechanism S is engaged by the supply conductors AC1 and AC2. The shutter E remains open during the period required for current flow through the photoelectric tube I to so reduce the electrical charge previously impressed on the condenser O that the resultant increase in the potential of the control grid 4 relative to the cathode 5 will make the tube M operatively conductive. When the tube M is thus rendered conductive its plate current flow through the resistance 7 increases the potential of the cathode 5 and thereby the potential of the control grid 20 of the thyratron Q. This makes the tube Q conductive with the result of energizing the relay R. Thereupon the switch RS opens the energizing circuit for the camera shutter mechanism S and closes the shutter E. This closes the shutter E and terminates the printing operation.

The termination of one printing operation as just described, puts the apparatus in condition for a following printing operation as soon as the sensitized strip F is suitably advanced and a new negative is put in place in the camera C if the next picture made is not to be printed from the negative used in making the previous picture, and as soon as any needed adjustment of the condenser charging potential is effected by the actuation of one or another of the push button switches 36. As previously stated, the time required to charge the condenser O after the charging circuit is established is ordinarily a fraction of a second only, so that the condenser will be fully charged by the time the operator is in position to effect actuation of the switch 21 and thereby temporarily disconnect the normally connected conductors 25 and 26.

For ordinary uses, now contemplated, of the apparatus shown, the resistances 15, 16, 17 and 18 should have resistance values so chosen and subject to such individual adjustments as to give four different exposure periods, one or another of which will give good reproduction results with practically every one of the different negatives to be reproduced. If, for example, the negatives to be reproduced are of such character that the average of the exposure periods required for them is five seconds, the resistances 15—18 may well be of such values that when the relay switch T2 is energized to short circuit resistances 15 and 16 while leaving resistances 17 and 18 in circuit, a basic exposure period of five seconds will be established. In such case the resistance values may well be such that the exposure period will be seven and a half seconds when only the resistance 18 is not short circuited, and will be ten seconds when all of the resistances are short circuited, and will be two and a half seconds when only the resistance 15 is not in circuit, and will be one and a quarter seconds when all of the resistances 15, 16, 17 and 18 are in circuit.

While the particular exposure times just stated are suitable for some practical operating conditions, it will be understood that those times are stated by way of illustration and example and not by way of limitation. It will be understood, also, that the exposure period may be varied in the general manner described through more than four steps in some cases, and by a smaller number of steps in other cases. For purposes of the present invention it is practically important, however, that the variations in the exposure period effected by the energization of the different relays T1, T2, etc. should be of definite magnitudes and suitable for the ordinary range of exposure period variation needed to obtain good results with all, or at least most of the negatives to be reproduced.

The energization of any one of the relays T1—T4 will leave a relay hold-in circuit closed so long as the potential between the energizing conductors AC2 and 37 is maintained. This makes it desirable to provide some means for insuring that all of the different relay hold-in circuits are open at the end of each printing operation, or at the end of each series of printing operations from the same negative. As diagrammatically shown, the switch U forms a means for disconnecting the conductor 37 from the supply conductor AC1 and thereby deenergizing the conductor 37. In the apparatus shown, the switch 21 must be opened momentarily at least to initiate the printing of each picture printed. In successively printing a plurality of pictures from a single negative, it is ordinarily desirable to keep the switch closed throughout the operation of said plurality of pictures.

While the switches U and 27 may well be simple hand-operated switches in some cases, in other cases they may be replaced by automatic switch mechanisms. Such replacement will ordinarily be necessary, or, at least, desirable, for example, when the present invention is incorporated in an automatic camera control system devised by me and adapted to print varying numbers of pictures from negatives successively inserted in the camera.

In the described operation of the apparatus shown, the duration of the exposure periods depends upon two factors, namely, the magnitude of the condenser discharging current flow through the photocell I when the charging circuit is opened, and the magnitude of the electrical charge acquired by the condenser when its charging circuit is closed. With the apparatus shown, the current flow through the photocell I, is automatically dependent upon the light transmitted to the photocell from the light chamber A' through the negative C and lens G to the photocell. The magnitude of the condenser charge acquired while the relay R is deenergized, depends upon the difference between the potentials of the points 14 and 32 of the voltage divider. Down movement of the slider engaging the potentiometer resistance 13 at the point 32, increases the potential difference between the points 14 and 32, and thereby increases the magnitude of the condenser charge acquired when the switch member RO is in position to connect the point 32 to the conductor 3. Conversely, up movement of the point 32 decreases the magnitude of the charge which can be given the condenser D. The potential difference between the points 14 and 32 may also be increased or decreased without adjustment of the point 32 by respectively decreasing or increasing the resistance between the lower end of the resistance 13 and the supply conductor DC2. As will be apparent, the adjustment of the slider point 32 will ordinarily be in the nature of a somewhat permanent calibration adjustment of the apparatus while the easy and rapidly effected adjustments obtained by the manipulation of the push button switches 36 are temporary working adjustments of the apparatus. One of the last mentioned adjustments is advantageously made every time a negative C in the camera is replaced by a negative having different reproducing characteristics which should be taken into account in determining the exposure period giving optimum reproduction results.

The need for such compensation adjustments becomes apparent when account is taken of the fact that two negatives which have the same aggregate light transmitting capacities, may differ widely in the contrasts between their respective light and dark portions. In consequence, an exposure period which will give optimum results in reproducing one negative picture, will undesirably under expose or over expose similar portions of the picture printed from the other negative. In general, the compensating adjustments of rheostatic means including the push button switches 36 required on any particular negative can be determined quickly and with sufficient accuracy by an ordinarily skilled operator from a visual examination of the negative.

I have discovered that in controlling the exposure period of a reproducing camera, or projection printer, by transmitting light through a negative to a phototube and using the resultant phototube current to control the discharge of a condenser, in the general manner hereinbefore described, it is advantageous to so transmit the light to the phototube as to produce a blurred or more or less completely disintegrated image of the negative picture or a portion thereof, on the cathode of the phototube. Thus, for example, when the picture on the negative includes a sharply defined figure 60 as shown in Fig. 2, better control results will be obtained if the image of that figure formed on the cathode of the phototube as shown in Fig. 3, is blurred or partially disintegrated, and ordinarily still better control results are obtained when the image of said figure formed on the cathode is blurred or disintegrated to such an extent that the outline of the figure is not distinguishable on the cathode.

I believe that the advantage which I obtain by transmitting a blurred or disintegrated image to the phototube cathode is due in substantial part, at least, to the fact that different portions of the cathode surface are not uniformly responsive to light transmitted to them. In consequence, when light is transmitted through a relatively thin portion of the negative to a cathode surface portion which is highly light responsive while light is transmitted through the less transparent portion of the negative to a portion of the cathode surface less responsive to light, the resultant phototube current is greater than it is when light is transmitted through the more transparent portion of the negative to a portion of the cathode surface less responsive to the light received than the portion of that surface receiving light transmitted through the less transparent portion of the negative. The effect of blurring or disintegrating the image formed on the surface of the cathode is to transmit light of approximately the same intensity to each portion of the cathode surface. The advantage obtained by blurring or disintegrating the image formed on the cathode ordinarily increases as the contrast between light and dark portions of the negative picture increases. The image blurring or disintegrating effect can be readily obtained in an especially simple and effective manner by selecting or arranging the measuring lens G so that the image of the negative picture formed on the cathode surface is out of focus.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In controlling the exposure period of a projection printer reproducing a picture on a transparency by transmitting light through the transparency, the method which consists in charging a condenser by subjecting it to a charging voltage and varying said charging voltage in predetermined accordance with the difference between the light transmitting capacity of a selected portion of the transparency picture and the light transmitting capacity of another portion of the transparency picture, and in transmitting a light through the transparency to the cathode at a rate in definite proportion to the average light transmitting capacity of the transparency and thereby creating a current flow through said tube of a magnitude dependent on the amount of light transmitted to said cathode and passing said current from the phototube to said condenser to discharge the latter at a rate automatically dependent on the magnitude of the current flow through the phototube.

2. The method as specified in claim 1, in which the charging voltage is varied in steps of definite predetermined magnitude to compensate for the differences in contrasts between the light and dark portions of different transparencies.

3. In a projection printer for reproducing a picture by transmitting printing light from said picture to light sensitive photographic material during a regulable exposure period, the combination of a circuit network having relatively positive and negative terminals arranged for connection to a source of unidirectional voltage, and including resistance forming a voltage divider having first, second and third points at potentials differing from the potential of said positive terminal by progressively increasing amounts, a phototube arranged for irradiation by printing light transmitted from said picture during the exposure period and having an anode connected to said voltage divider at said first point and having a cathode, a condenser connecting said cathode to said voltage divider at said second point, a condenser charging branch including a switch and connected at one end to the connected terminals of said cell and condenser and connected at its other end to said voltage divider at said third point, an electronic valve having an anode and a cathode and an output circuit including a portion of said voltage divider resistance connected between said anode and cathode and having a control grid connected to the cathode of said phototube, a device operable to initiate and to terminate an exposure period, means operable to simultaneously open said switch and to actuate said device to initiate said exposure, and means operable under control of said valve to close said switch and terminate said exposure period on a predetermined decrease in the negative charge on the condenser effected by the phototube current during the exposure period so terminated.

4. A combination as specified in claim 3, in which said network includes rheostatic means associated with said voltage divider and selectively adjustable to vary the potential difference between said second and third points by one or another of a plurality of predetermined amounts to thereby vary the charge acquired by the condenser when said switch is closed.

5. A combination as specified in claim 4 in which said rheostatic means comprises a plurality of resistance sections and manually controlled switching means operable to vary the number of said sections operatively associated with said voltage divider.

6. A combination as specified in claim 4 in which said rheostatic means comprises a plurality of resistance sections and manually controlled switching means operable to vary the number of said sections operatively associated with said voltage divider, and resetting means operable to restore said switching mechanism to a normal condition at the termination of each exposure period.

7. A combination as specified in claim 4, in which said third point is adjustable along said divider resistance to vary the difference between the potentials of said second and third points.

8. In a projection printer for reproducing a transparent picture by transmitting light through the pictures to light sensitive photographic material during a regulable exposure period, the combination of a circuit network including a resistance forming a voltage divider and having relatively positive and negative terminals arranged for connection to a source of unidirectional voltage, a phototube arranged for irradiation by light transmitted through said picture during the exposure period and having an anode connected to said resistance at one point and having a cathode, a condenser connecting said cathode to said resistance at a second point at which the potential is less positive than at said one point, a condenser charging branch including a switch and connected at one end to the connected terminals of said cell and condenser and connected at its other end to said resistance at a third point at which the potential is less positive than at said second point, an electronic valve having an anode and a cathode and an output circuit including a portion of said resistance connected between said anode and cathode and having a control grid connected to the cathode of said phototube, a device operable to initiate and to terminate an exposure period, means operable to simultaneously open said switch and to actuate said device to initiate said exposure, and means operable under control of said valve to close said switch and terminate said exposure on a predetermined decrease in grid bias of said valve produced by the condenser discharging action occurring during the exposure period.

9. A combination as specified in claim 8, in which the device operable to initiate and terminate an exposure period is an electromagnetic shutter mechanism.

10. A projection printer for reproducing a picture by transmitting printing light from said picture to light sensitive photographic material during a regulable exposure period, the combination comprising a circuit network including a resistance forming a voltage divider and having positive and negative terminals arranged for connection to a source of unidirectional voltage, a photo cell irradiated by printing light transmitted from said picture and having an anode connected to said resistance at one point and having a cathode, a condenser connecting said cathode to said resistance at a second point at which the potential is less positive than at said one point, a condenser charging branch including a switch and connected at one end to the connected terminals of said cell and condenser and connected at its other end to said resistance at a third point at which the potential is more negative than at said second point, an electronic valve having an anode and a cathode and an output circuit including a portion of said resistance connected between said anode and cathode and having a control grid connected to the cathode of said phototube, a gaseous discharge tube having a control grid connected to said output circuit and having an anode and a cathode and means including a relay winding and a switch through which the cathode and anode of said discharge tube are connected between points of resistance so respectively positive and negative that said tube will pass from its non-conductive to its conductive condition on a predetermined decrease in the extent to which the control grid of said valve is negative relative to the cathode of said valve, a device operable to initiate and to terminate an exposure period and means actuated by said relay winding to open the above mentioned switch and to actuate said device to initiate said exposure period when said switch is momentarily closed and to close the above mentioned switch and terminate said exposure on a predetermined change in the charge on the condenser.

11. A combination as specified in claim 10 in which said gaseous discharge tube has its cathode connected to ground and includes a screen grid, and including a glow tube and a screen grid resistance connecting said screen grid to ground, and in which said glow tube is connected between an intermediate point of said screen grid resistance and the negative network terminal, to thereby maintain the latter negative relative to the ground by the substantially constant voltage across the glow tube.

12. A combination as specified in claim 10 in which the said device operable to initiate and terminate an exposure comprises an electromagnetic shutter actuator and a switch controlling the energization of said shutter actuator.

13. In a projection printer for reproducing a transparent picture by transmitting light through the picture to light sensitive photographic material during a regulable exposure period, the combination of an electromagnetic actuated shutter mechanism including a switch and operable to initiate and terminate an exposure period on the closure and opening, respectively, of said switch, an electronic valve having an input circuit including a control grid and an output circuit including a source of unidirectional voltage, an anode and a cathode, a condenser connected between said grid and cathode, means including a second switch operable as said second switch is closed and opened to establish and interrupt a circuit for charging said condenser in the direction to lower the potential of said grid relative to said cathode and make said valve non-conductive, a phototube responsive to light transmitted through the picture during the exposure period and operative when said second switch is open to discharge said condenser and thereby restore the conductivity of said valve at a rate depending on the transparency of said picture, a gaseous discharge tube having an input circuit including a control grid connected to the output circuit of the first mentioned valve and an output circuit including an anode, a cathode, a source of unidirectional voltage, a relay winding and a third switch operable to momentarily open the last mentioned output circuit, and means including said relay winding for respectively closing and opening said first switch and opening and closing said second switch according as current does or does not flow in the output circuit of said gaseous discharge tube, whereby said tube is made conductive only when said valve becomes conductive, and is made non-conductive only when said third switch is opened, so that an exposure period may be initiated by opening said third switch and is terminated when the reduction of the condenser charge by the phototube makes said valve, and thereby said tube conductive.

14. A combination as specified in claim 3, including rheostatic resistance connected in series with said voltage divider resistance between said terminals and selectively adjustable to vary the potential difference between said second and third points by one or another of a plurality of predetermined amounts to vary the charge acquired by the condenser when said switch is closed.

15. A method as specified in claim 1, in which the said transmitting light in predetermined proportion to the average light transmitting capacity of the transparency is so transmitted through the transparency to the phototube cathode as to impress on said cathode a blurred image of the transparency picture.

JACOB RABINOWITZ.

REFERENCES CITED

The following references are of record in the file of this patent:

UNITED STATES PATENTS

| Number | Name | Date |
|---|---|---|
| 1,944,024 | Foster | Jan. 16, 1934 |
| 1,946,621 | Hopkins | Feb. 13, 1934 |
| 1,954,338 | Tuttle et al. | Apr. 10, 1934 |
| 1,973,468 | Denis | Sept. 11, 1934 |
| 1,979,719 | Weisse | Nov. 6, 1934 |
| 2,000,589 | Fuller | May 17, 1935 |
| 2,038,430 | Jameson | Apr. 21, 1936 |
| 2,090,825 | Anthony | Aug. 24, 1937 |
| 2,161,371 | Mees | June 6, 1939 |
| 2,253,055 | Tuttle et al. | Aug. 19, 1941 |
| 2,254,878 | Adams | Sept. 2, 1941 |
| 2,258,994 | Merriman et al. | Oct. 14, 1941 |
| 2,298,344 | Burnham | Oct. 13, 1942 |
| 2,353,218 | Burnham et al. | July 11, 1944 |